2,573,343

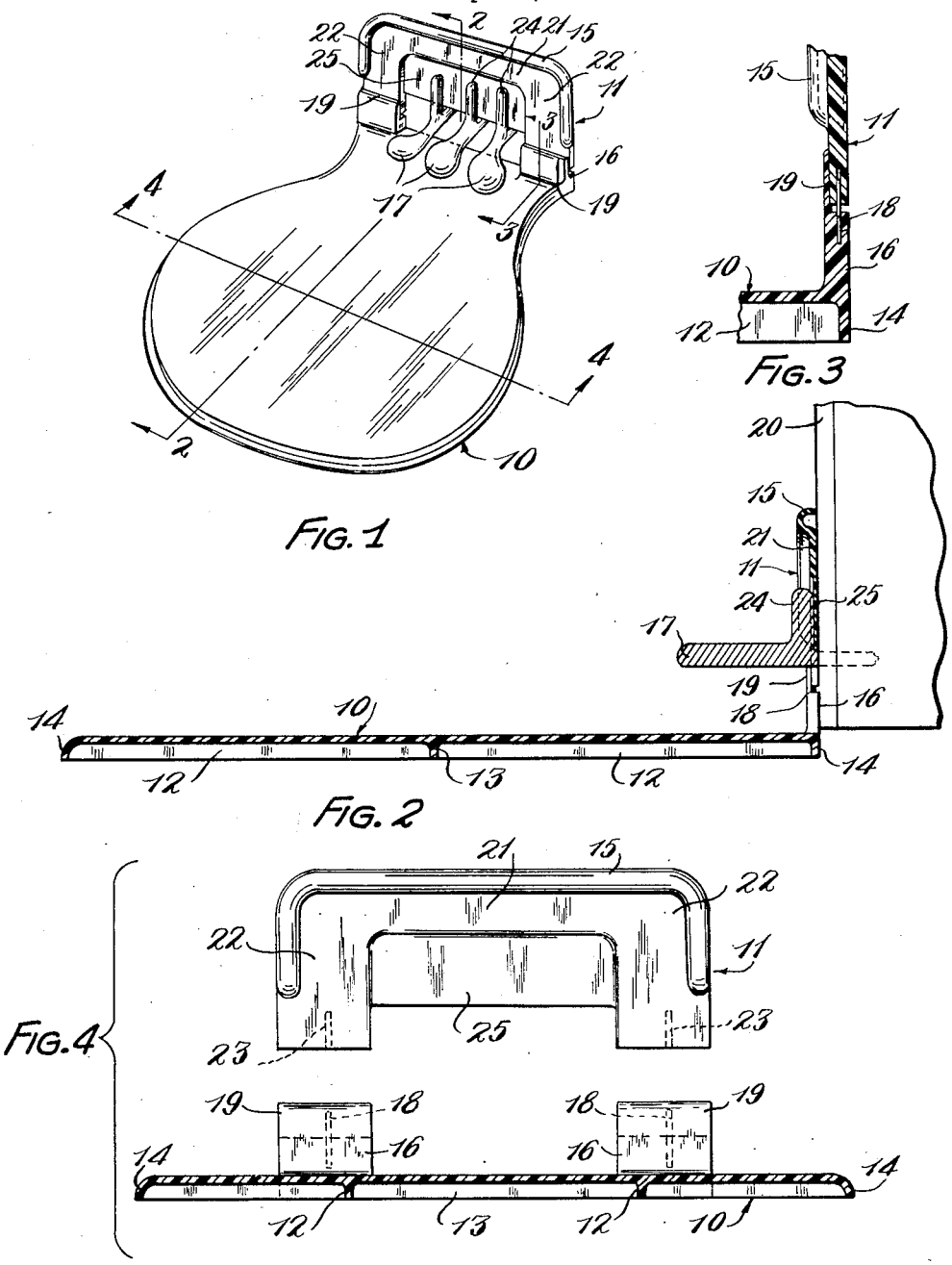
Oct. 30, 1951 — I. F. KULT — 2,573,343
SCUFF PAD FOR CONNECTION WITH PIANO PEDALS
Filed Sept. 1, 1950
INVENTOR.
IRVING F. KULT
BY Hudson, Boughton,
Williams, David & Hoffmann
ATTORNEYS Patented Oct. 30, 1951

UNITED STATES PATENT OFFICE 2,573,343

SCUFF PAD FOR CONNECTION WITH PIANO PEDALS

Irving F. Kult, Cleveland, Ohio

Application September 1, 1950, Serial No. 182,763

4 Claims. (Cl. 84—225)

This invention relates to improvements in scuff pads for connection with piano pedals.

One of the objects of the invention is the provision of a pad of good appearance and long life adapted to protect the floor or floor covering in front of and beneath the pedals of a piano as well as the kick board of the piano adjacent the pedals.

Another object of the invention is the provision of a pad of relatively rigid material made in two parts which may be joined together and connected with the piano in a single operation.

Other objects and features of novelty will appear as I proceed with the description of that embodiment of the invention which, for the purposes of the present application, I have illustrated in the accompanying drawing in which, Fig. 1 is a perspective view of the assembled pad shown connected with the foot pedals of a piano;

Fig. 2 is an enlarged sectional view taken substantially on the line 2—2 of Fig. 1;

Fig. 3 is a fragmental detailed sectional view on a still larger scale, the view being taken substantially on the line 3—3 of Fig. 1; and Fig. 4 is a large scale view of the two elements of the pad in position to be assembled and connected with the piano pedals, the horizontal element of the pad being shown in section substantially on the line 4—4 of Fig. 1.

The scuff pad of this invention is formed in two parts, that is to say, a horizontal element 10 and a vertical element 11. The material of which it is constructed may be plastic, and it is preferably so shaped as to have considerable rigidity. To this end the horizontal element may have a pair of ribs 12 running lengthwise of the element and one or more transverse ribs 13, as well as a turned-down rim 14 extending entirely around its periphery. For the same purpose the vertical element may have a bead or corrugation 15 extending over the top and down the sides of that element.

At the rear of the horizontal element there are two upstanding projections 16 spaced apart sufficiently to permit the pedals 17 of a piano to extend forward between the projections as indicated in Fig. 1. Each of these projections has mounted therein a vertical pin 18 which extends upwardly behind an overlap 19 formed integral with the projection. When the scuff pad is to be put in position, it is slid along the floor toward the pedals until the upstanding projections 16 contact the kick board of the piano indicated at 20 in Fig. 2.

The vertical element 11 in addition to the bead 15 previously mentioned comprises a transverse bar 21 and two side extensions 22 which are spaced apart the same distance as the upwardly extending projections 16. In the lower ends of these extensions 22, sockets 23 are formed to receive the pins 18 when the element 11 is lowered into operative position behind the upstanding guards 24 of the pedals. The element 11 also comprises a thin plate 25 interposed between the extensions 22 and integral with the other parts of the elements. This plate is adapted to slide down behind the guards 24 of the pedals in the limited space there available. The element 11 is therefore held at the bottom by the pin and socket connections 18, 23 and higher up by the pedal guards 24 against which the plate 25 impinges. In some cases the pedals may be disposed high enough above the floor to prevent the plate 25 and element 11 from descending far enough to cause the extensions 22 to meet the projections 16. In such cases the gap between these projections and extensions will be concealed by the overlaps 19.

When the element 10 is pushed into position with the upwardly extending projections on opposite sides of the pedals and bearing against the kick board 20, the two elements may be connected together and to the piano by sliding the element 11 downwardly with the plate 25 behind the guards 24 of the pedals and causing the sockets 23 to receive the pins 18. The parts will then be locked together and held in place by this single assembly operation.

Having thus described the invention, I claim:

1. In a scuff pad for connection with piano pedals, a substantially rigid horizontal element adapted to cover and protect the floor in front of and beneath the pedals, said scuff pad comprising also a separate vertical element adapted to engage the kick board of the piano having side extensions adapted to straddle the pedals and engage the rear end of said horizontal element, said vertical element comprising a thin plate intermediate said side extensions adapted to be slid down between the kick board and the upstanding guards of the pedals.

2. A scuff pad as defined in claim 1 comprising interfitting pin and socket means on said horizontal and vertical elements to prevent relative lateral movement.

3. In a scuff pad for use in connection with piano pedals, a substantially rigid horizontal element adapted to cover and protect the floor in front of and beneath the pedals, said horizontal element having a pair of projections extending upwardly on opposite sides of the pedals directly adjacent the kick board of the piano, said scuff pad comprising also a separate vertical element adapted to engage the kick board of a piano having side extensions adapted to straddle the pedals and contact said upwardly extending projections, said vertical element comprising a thin plate intermediate said side extensions adapted to be slid downwardly between the kick board and the upstanding guards of the pedals, and said side extensions and upwardly extending projections overlapping when the said vertical element is in its lowered position.

4. In a scuff pad for use in connection with piano pedals, a substantially rigid horizontal element adapted to cover and protect the floor in front of and beneath the pedals, said horizontal element having a pair of projections extending upwardly on opposite sides of the pedals directly adjacent the kick board of the piano, said scuff pad comprising also a separate vertical element adapted to engage the kick board of a piano having side extensions adapted to straddle the pedals and contact said upwardly extending projections, said vertical element comprising a thin plate intermediate said side extensions adapted to be slid downwardly between the kick board and the upstanding guards of the pedals, interfitting pin and socket means on said upwardly extending projections and said side extensions to prevent relative lateral movement, and an overlap on each of said upwardly extending projections to cover the joints between them and said extensions.

IRVING F. KULT.

No references cited.